(12) United States Patent  
Meier et al.

(10) Patent No.: US 7,775,766 B2
(45) Date of Patent: Aug. 17, 2010

(54) GAS TURBINE COMPONENT

(75) Inventors: Reinhold Meier, Dorfen (DE); Erich Steinhardt, Munich (DE)

(73) Assignee: MTU Aero Engines GmbH, Munich (DE)

( * ) Notice: Subject to any disclaimer, the term of this patent is extended or adjusted under 35 U.S.C. 154(b) by 309 days.

(21) Appl. No.: 10/582,930

(22) PCT Filed: Dec. 9, 2004

(86) PCT No.: PCT/DE2004/002706

§ 371 (c)(1),
(2), (4) Date: Jun. 13, 2006

(87) PCT Pub. No.: WO2005/061855

PCT Pub. Date: Jul. 7, 2005

(65) Prior Publication Data

US 2007/0122269 A1 May 31, 2007

(30) Foreign Application Priority Data

Dec. 20, 2003 (DE) ................. 103 60 164

(51) Int. Cl.
F01D 11/12 (2006.01)
(52) U.S. Cl. .................................. 415/173.4
(58) Field of Classification Search ............. 415/173.1, 415/173.4, 173.5, 174.4, 174.5, 200
See application file for complete search history.

(56) References Cited

U.S. PATENT DOCUMENTS

| 3,053,694 A | 9/1962 | Daunt et al. |
| 3,126,149 A | 3/1964 | Bowers, Jr., et al. |
| 3,460,759 A | 8/1969 | Gregory et al. |
| 3,825,364 A * | 7/1974 | Halila et al. ............... 415/116 |
| 4,155,755 A * | 5/1979 | Sara ............................ 148/514 |
| 4,377,370 A | 3/1983 | Porcelli |
| 4,536,127 A * | 8/1985 | Rossmann et al. ....... 415/173.4 |
| 5,951,254 A * | 9/1999 | Sikorski et al. ............. 416/224 |
| 6,062,813 A * | 5/2000 | Halliwell et al. ......... 415/174.5 |
| 6,412,541 B2 | 7/2002 | Roesler et al. |
| 6,652,222 B1 | 11/2003 | Wojtyczka et al. |
| 6,827,556 B2 | 12/2004 | Simon |
| 7,108,828 B2 * | 9/2006 | Lefebvre et al. ............... 419/2 |
| 2003/0107181 A1 | 6/2003 | Wieghardt |
| 2003/0118762 A1 | 6/2003 | Brown et al. |
| 2004/0141837 A1 | 7/2004 | McMillan et al. |
| 2004/0258517 A1 | 12/2004 | Naik et al. |
| 2005/0111966 A1 * | 5/2005 | Metheny ..................... 415/116 |

FOREIGN PATENT DOCUMENTS

| DE | 100 24 302 | 11/2001 |
| EP | 1 013 890 | 6/2000 |
| EP | 1 186 748 | 3/2002 |
| EP | 1 344 895 | 9/2003 |
| EP | 1 391 597 | 2/2004 |
| GB | 793886 | 4/1958 |
| GB | 1 242 864 | 8/1971 |
| JP | 59-153902 | 9/1984 |
| WO | WO 03/054360 | 7/2003 |

* cited by examiner

*Primary Examiner*—Edward Look
*Assistant Examiner*—Nathaniel Wiehe
(74) *Attorney, Agent, or Firm*—W. F. Fasse; W. G. Fasse

(57) ABSTRACT

A static gas turbine component, especially for an aircraft engine, is formed at least partially region-wise of metal foam. An abradable shroud lining of metal foam and a carrier allow a radial through-flow of gas.

19 Claims, 5 Drawing Sheets

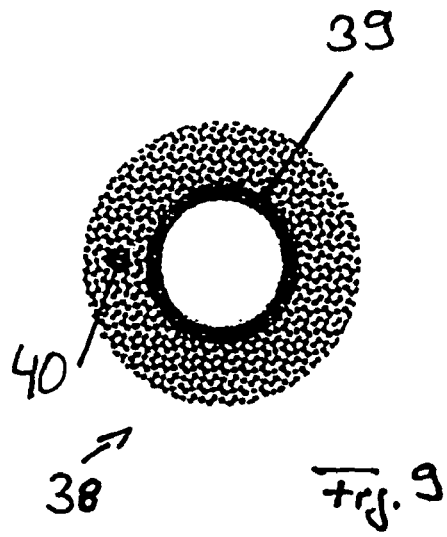
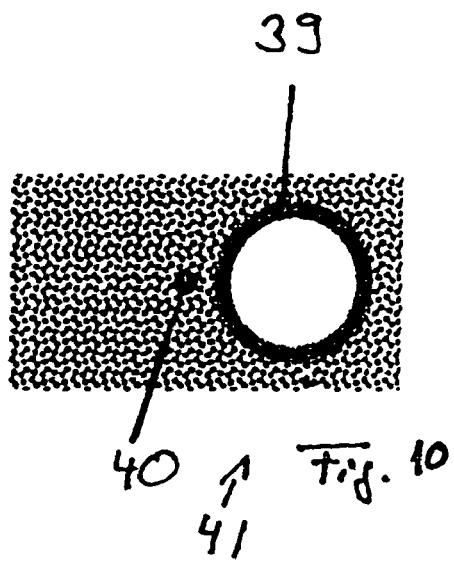
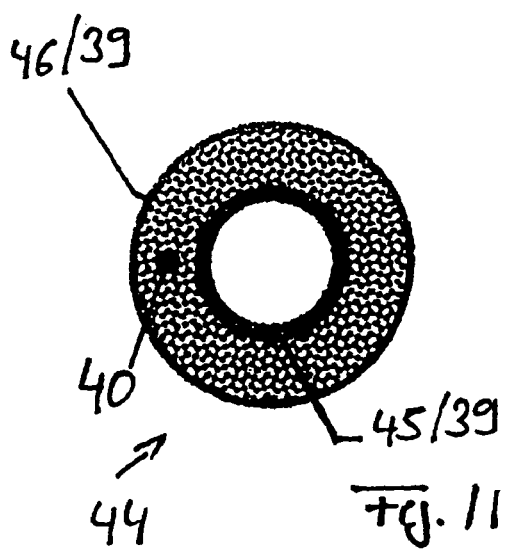
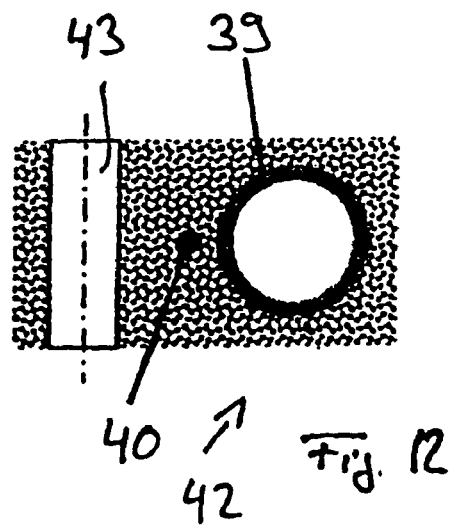
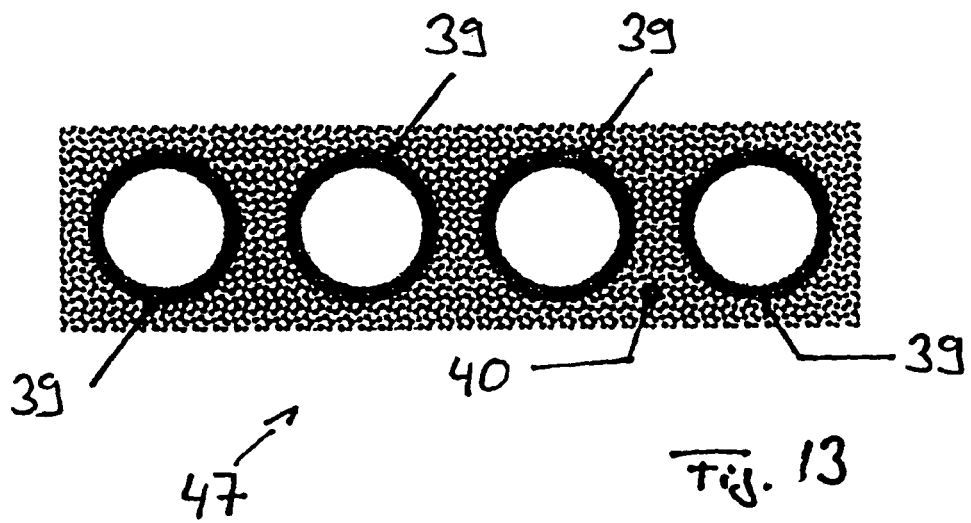

GAS TURBINE COMPONENT

FIELD OF THE INVENTION

The invention relates to a gas turbine component, namely a static gas turbine component.

BACKGROUND INFORMATION

Modern gas turbines, especially aircraft engines, must satisfy the highest demands with respect to reliability, weight, power, economy, and operating service life. In the last decades, aircraft engines were developed especially in the civil sector, which fully satisfy the above demands and have achieved a high degree of technical perfection. In the development of aircraft engines, among other things, the material selection, the search for new suitable materials, as well as the search for new production methods play a decisive roll.

The most important materials used these days for aircraft engines or other gas turbines are titanium alloys, nickel alloys (also called super alloys) and high strength steels. The high strength steels are used, for example, for compressor housings and turbine housings. Titanium alloys are typical materials for compressor parts. Nickel alloys are suitable for the hot parts of the aircraft engine. Primarily the investment casting as well as the forging are known from the state of the art as production methods for gas turbine components of titanium alloys, nickel alloys or other alloys. All highly loaded or stressed gas turbine components, such as components for a compressor for example, are forged parts. Components for a turbine, on the other hand, are typically embodied as investment cast parts.

For reducing the weight of gas turbine components, it is already known from the state of the art, to utilize metal matrix composite materials (so-called MMC materials). In such MMC materials, high strength fibers are embedded in the metal material. The production of gas turbine components of such MMC materials is, however, complicated and thus expensive.

SUMMARY OF THE INVENTION

It is in the sense of the present invention to propose alternative possibilities for weight reduction of static gas turbine components. The mass of the static gas turbine components namely influences the total weight of a gas turbine, especially of an aircraft engine. The more that the weight of the gas turbine components can be reduced, the more advantageous will be the so-called thrust-weight ratio of the aircraft engine, which represents a decisive competitive feature for aircraft engines.

Beginning from this starting point, the problem underlying the present invention is to propose a novel static gas turbine component.

This problem is solved in that the above mentioned gas turbine component is further developed through the features of the invention. According to the invention, the static gas turbine component is formed at least partially of a metal foam. In the sense of the present invention, it is proposed for the first time to embody static gas turbine components at least partially of metal foam. The use of metal foams enables a cost effective alternative relative to MMC materials and a significant weight savings.

According to a particular preferred embodiment, the invention is directed to a gas turbine engine comprising a rotatable rotor with rotor blades, seal fins on radially outer blade tips of the rotor blades, and an abradable shroud lining arranged circumferentially around the blade tips such that the seal fins graze the abradable shroud lining, wherein:

the abradable shroud lining comprises a carrier and an open-pored metal foam that is rigidly connected with the carrier, the metal foam of the abradable shroud lining is bare and exposed and arranged relative to the rotor so that the seal fins directly graze the metal foam, and the carrier has holes therein allowing gas communication through the holes and through the open-pored metal foam in a radial gas flow direction as defined with respect to an axis of the gas turbine engine.

BRIEF DESCRIPTION OF THE DRAWINGS

Example embodiments of the invention are described in further detail, without being limited to this, in connection with the drawing. Therein it is shown by:

FIG. 9 a gas turbine component according to the invention, embodied as a pipe line system according to a further example embodiment of the invention, in a sharply schematized illustration;

FIG. 10 a gas turbine component according to the invention embodied as a pipe line system according to a further example embodiment of the invention, in a sharply schematized illustration;

FIG. 11 a gas turbine component according to the invention embodied as a pipe line system according to a further example embodiment of the invention, in a sharply schematized illustration;

FIG. 12 a gas turbine component according to the invention embodied as a pipe line system according to a further example embodiment of the invention, in a sharply schematized illustration; and FIG. 13 a gas turbine component according to the invention embodied as a pipe line system according to a further example embodiment of the invention, in a sharply schematized illustration.

DETAILED DESCRIPTION OF EXAMPLE EMBODIMENTS OF THE INVENTION

The present invention is described in greater detail in the following with reference to FIGS. 1 to 13, whereby FIGS. 2 to 13 respectively show gas turbine components according to the invention in a strongly or sharply schematized manner. Before addressing the details of the gas turbine components according to the invention, however, steps of a preferred production method for static gas turbine components of metal foam shall first be described with reference to FIG. 1.

Figure 1:
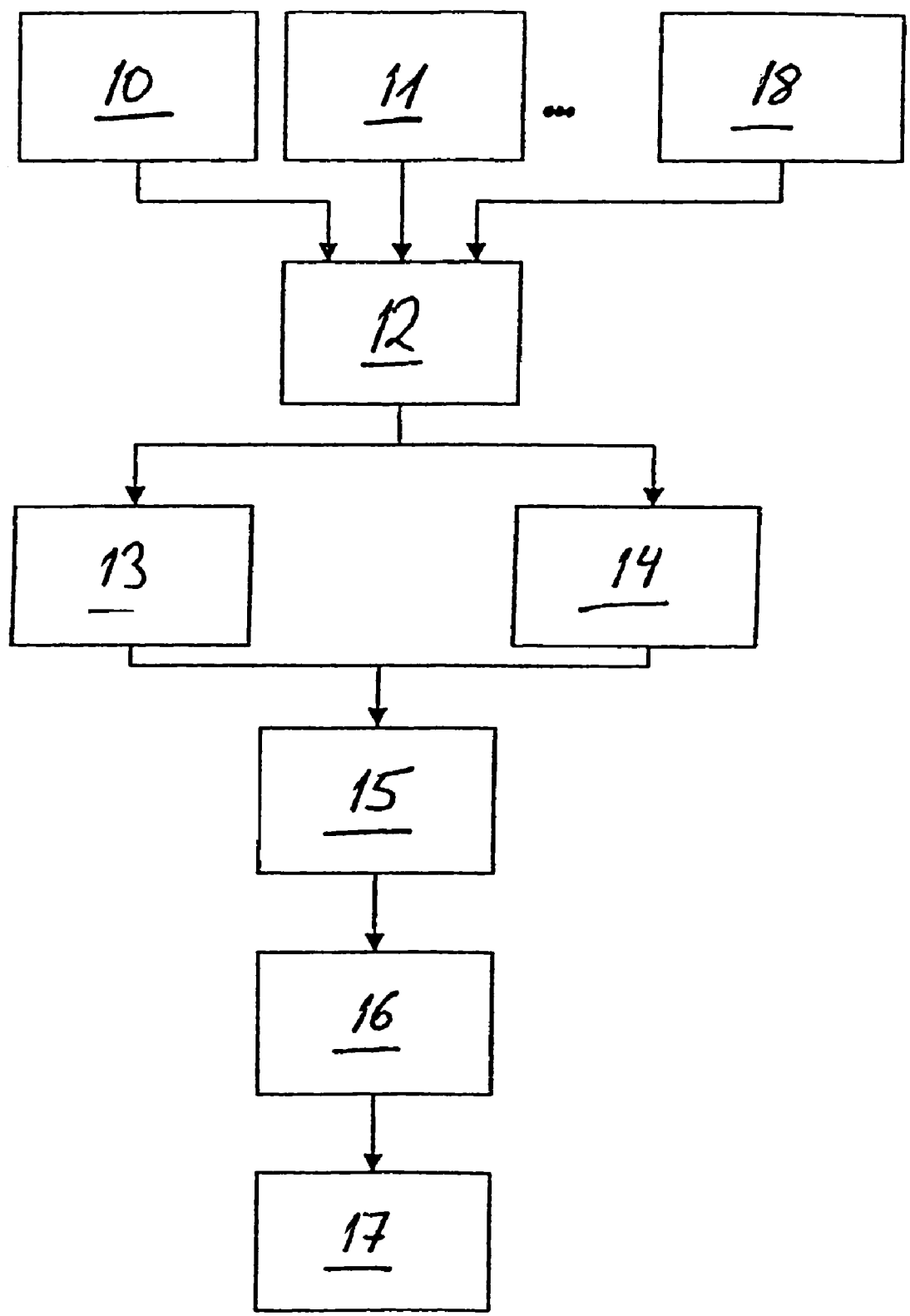
FIG. 1 a block circuit diagram for explaining a method for the production of gas turbine components according to the invention.

For producing a static gas turbine component according to the invention for an aircraft engine, one proceeds according to FIG. 1 in such a manner that a metal powder is prepared in a first step 10 and a propellant is prepared in a second step 11. The prepared metal powder is a metal powder on the basis of an aluminum alloy or titanium alloy or nickel alloy. It is also possible to use metal powders on the basis of a cobalt alloy or an iron alloy. Moreover, metal powders of intermetallic titanium-aluminum alloys can be used. Especially titanium hydride is prepared as the propellant.

The prepared metal powder as well as the prepared propellant are mixed in a step 12. The mixture of metal powder and propellant arising after the mixing is then compressed to form a semi-finished part. The compressing can be carried out either in the sense of the step 13 through extrusion, or in the sense of the step 14 through axial hot pressing. At the end of the compression according to step 13 or step 14, thereby a semi-finished part is present, which is visualized through the step 15 in the flow diagram of the FIG. 1. The semi-finished part is externally as good as indistinguishable from a typical metal, however it contains the propellant and can therefore be foamed-up, i.e. is expandable by foaming.

For producing the gas turbine component, the semi-finished part present in the step 15 is warmed or heated in the sense of the step 16, and in particular to just slightly above its melting temperature, so that the metal is melted and a gas evolution or release of the propellant results. Due to the gas evolution of the propellant, the foaming-up or foaming expansion of the semi-finished part is triggered. The foaming-up or foaming expansion is carried out so long until a defined degree of foaming is reached. As soon as this defined degree of foaming is reached, the foaming expansion is ended in that a cooling-off below the melting point of the utilized metal powder occurs. Thereby the foam structure is stabilized. The foaming expansion or foaming-up that was triggered by the heating of the semi-finished part above the melting point of the metal powder, as well as the corresponding ending or terminating of the foaming expansion through cooling-off below the melting point of the metal powder, are visualized together through the step 16. Following the step 16, a surface machining or some other processing or refining treatment of the produced component can still occur in the sense of the step 17. Thus, for example, the component can be connected with a carrier.

Furthermore, FIG. 1 shows, in the sense of a step 18, that further compositional components in addition to the metal powder prepared in the sense of the step 10 and the propellant prepared in the sense of the step 11 can be mixed with the metal powder and the propellant in the step 12. The further compositional components can, for example, be an additional metal powder with a different melting point or different powder grain size, or a different propellant or also ceramic particles, ceramic fibers or some other inorganic or organic elements.

Figure 2:
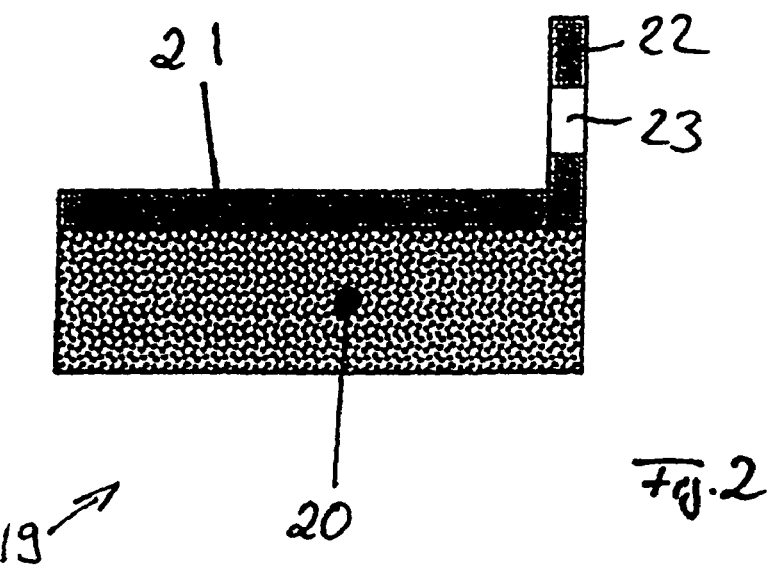
FIG. 2 a gas turbine component according to the invention embodied as a housing structure according to a first example embodiment of the invention, in a sharply schematized illustration.

FIG. 2 shows a first example embodiment of a gas turbine component according to the invention, which forms a housing structure 19, whereby the housing structure 19 is formed at least region-wise, i.e. in partial regions, of metal foam. The housing structure 19 of the FIG. 2 has a first section or region 20 that is formed of metal foam, and a second region 21 that serves as a carrier for the metal foam. In the example embodiment of the FIG. 2, the carrier 21 is arranged on one side of the metal foam 20, whereby the metal foam 20 is fixedly or rigidly connected with the carrier 21. Carrier 21 and metal foam 20 form a simple or single sandwich structure in the example embodiment of the FIG. 2. The carrier 21 further has an angled section 22, whereby the section 22 comprises a bored hole 23 for the connection with other components.

Figure 3:
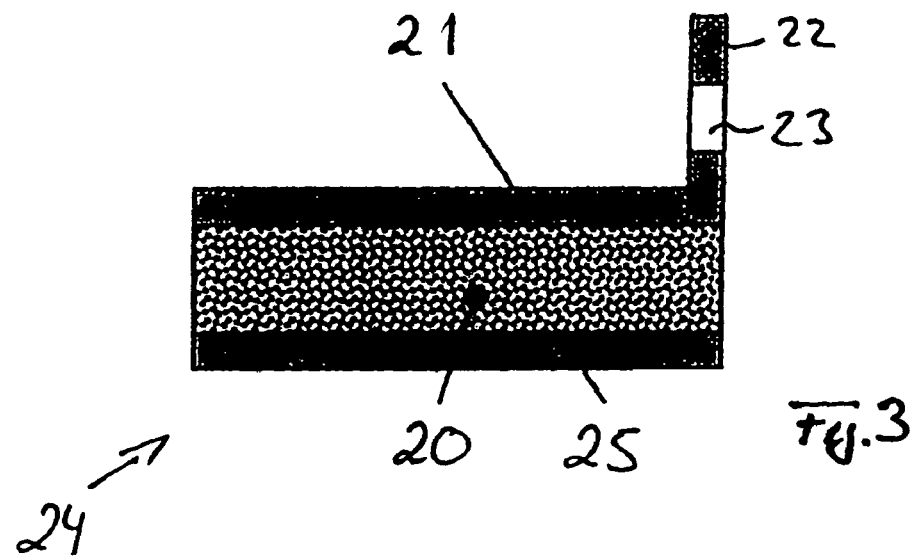
FIG. 3 a gas turbine component according to the invention embodied as a housing structure according to a second example embodiment of the invention, in a sharply schematized illustration.

FIG. 3 similarly shows a gas turbine component according to the invention embodied as a housing structure 24, whereby the example embodiment of the FIG. 3 differs from the example embodiment of the FIG. 2 in that a section or region 21 as well as 25 embodied as a carrier is arranged on both sides of the metal foam 20 and is fixedly or rigidly connected with the metal foam 20. The arrangement of the FIG. 3 can also be called a double sandwich construction. The carriers 21 as well as 25 on both sides of the metal foam 20 can consist of the same or different materials, namely metal alloys.

Figure 4:
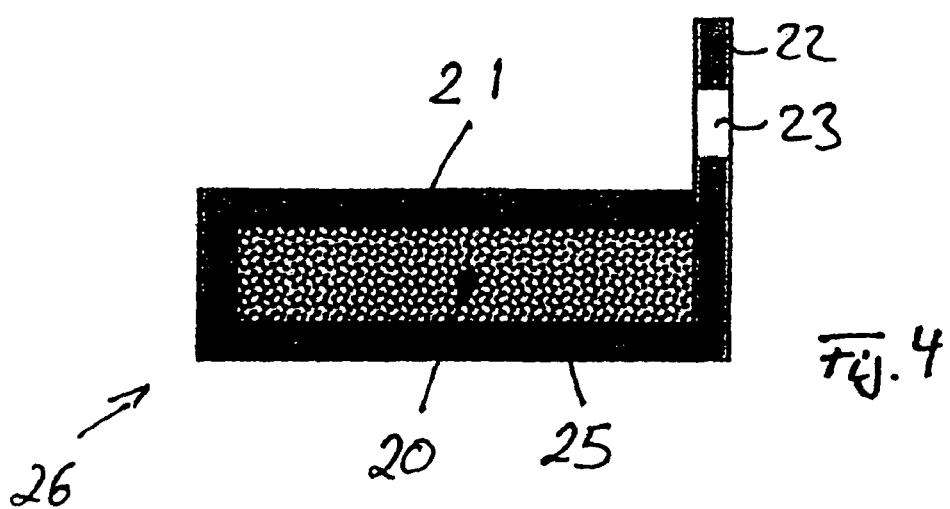
FIG. 4 a gas turbine component according to the invention embodied as a housing structure according to a third example embodiment of the invention, in a sharply schematized illustration.

A further gas turbine component according to the invention embodied as a housing structure 26 is shown in the example embodiment of the FIG. 4, which gas turbine component is similarly formed region-wise of metal foam 20, whereby the metal foam 20 is surrounded on all sides by sections or regions embodied as carriers in the example embodiment of the FIG. 4.

Figure 5:
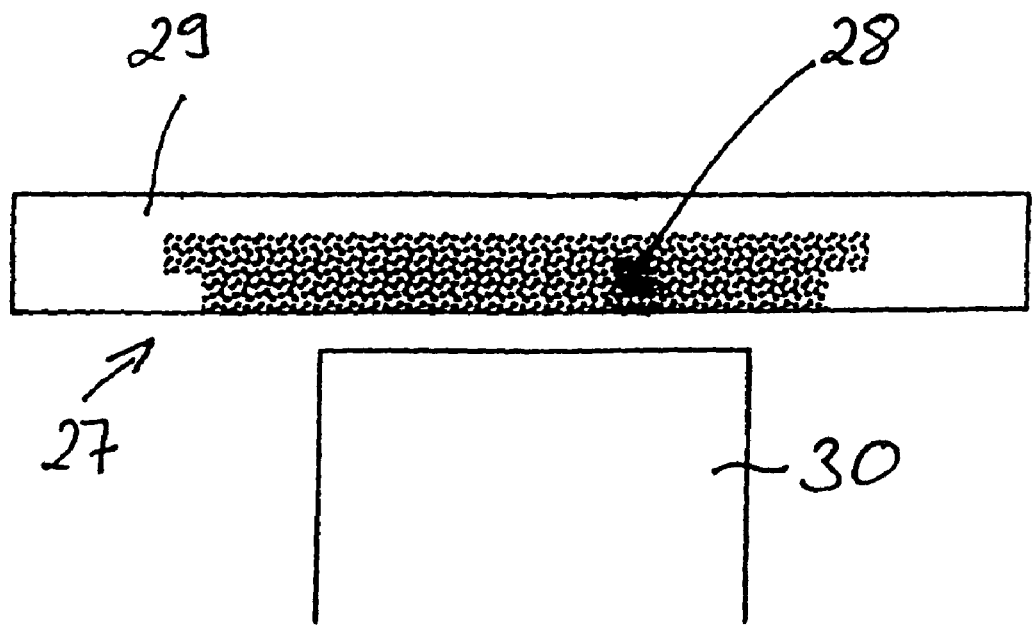
FIG. 5 a gas turbine component according to the invention embodied as a lining or facing of an inlet or intake according to a further example embodiment of the invention, in a sharply schematized illustration.

FIGS. 5 to 8 show example embodiments of static gas turbine components according to the invention, in which the inventive components form a so-called running-in lining or abradable shroud lining. Thus, FIG. 5 shows a first inventive abradable shroud lining 27, that is formed of a metal foam 28, whereby the metal foam 28 is fixedly or rigidly connected with a carrier 29. The abradable shroud lining 28 serves for the wear-free or low-wear grazing of a rotating rotor blade 30 of the gas turbine. The intake lining 27 remains stationary or fixed relative to the rotating rotor blade 30 and thus forms a static gas turbine component.

Figure 6:
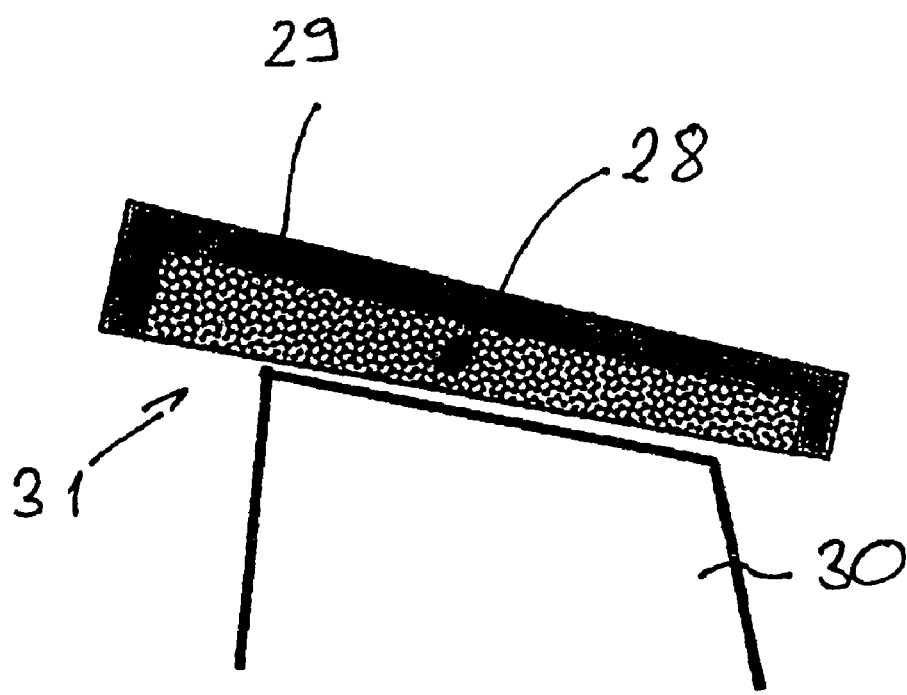
FIG. 6 a gas turbine component according to the invention embodied as an intake lining according to a further example embodiment of the invention, in a sharply schematized illustration.

FIG. 6 shows a further abradable shroud lining 31, which again is formed of a metal foam 28 and a carrier 29 fixedly or rigidly connected with the metal foam 28. The lining 31 of the FIG. 6 also serves for the grazing of radially outer ends of rotating rotor blades of the gas turbine, whereby the carrier 29 of the lining 31 of the FIG. 6 takes on a thermal isolation function.

Figure 7:
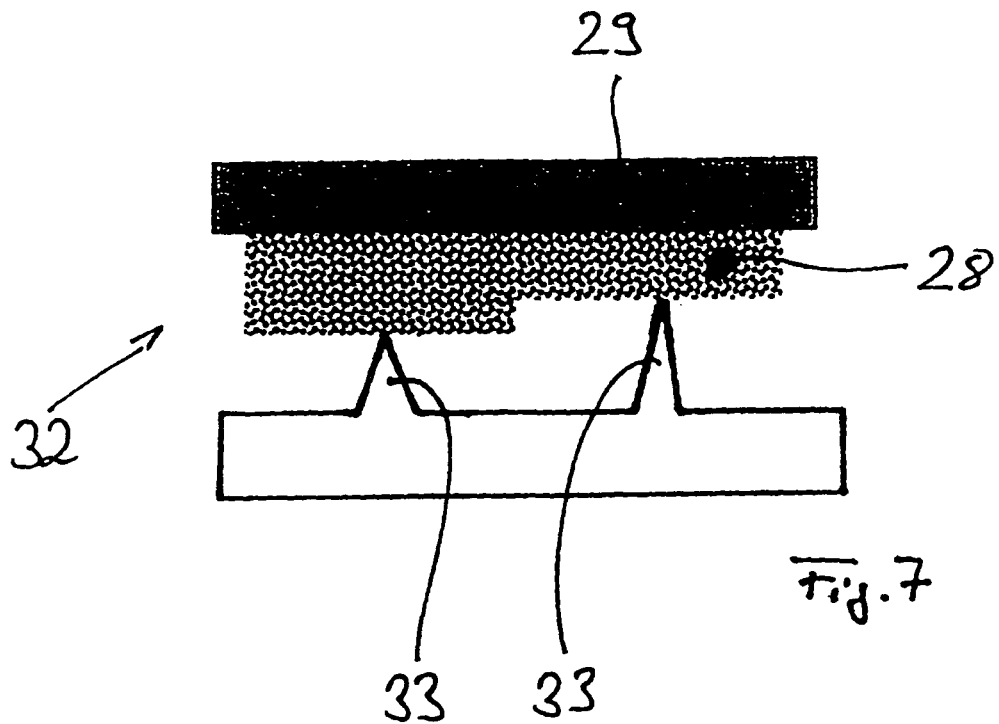
FIG. 7 a gas turbine component according to the invention embodied as an intake lining according to a further example embodiment of the invention, in a sharply schematized illustration.

FIG. 7 shows a further inventive abradable shroud lining 32, which again consists of a metal foam 28 and a carrier 29 allocated to the metal foam 28 as well as being fixedly or rigidly connected with the metal foam 28. The static or stationary lining 32 of the FIG. 7 cooperates with labyrinth seals 33, which are also referred to as seal fins. Such seal fins have different external radii, as is schematically illustrated in FIG. 7, so that the lining 32 provided by the metal foam 28 has a stepped contour. The inner diameter of the lining 32 provided by the metal foam is adapted or fitted to the outer diameter of the labyrinth seals 33. It is noted that the embodiment of the lining 32 according to FIG. 7 is a particularly preferred embodiment of the present invention, because the honeycomb construction of the lining known from the state of the art can be replaced with such a metal foam lining that cooperates with labyrinth seals. As already mentioned, the back surface of the metal foam 28 is fixedly or rigidly connected continuously surfacially onto a carrier surface of the carrier 29, especially glued or soldered thereto, whereby the metal foam 28 is continuously supported along the back surface thereof on the carrier surface of the carrier 29, as shown in FIG. 7.

Figure 8:
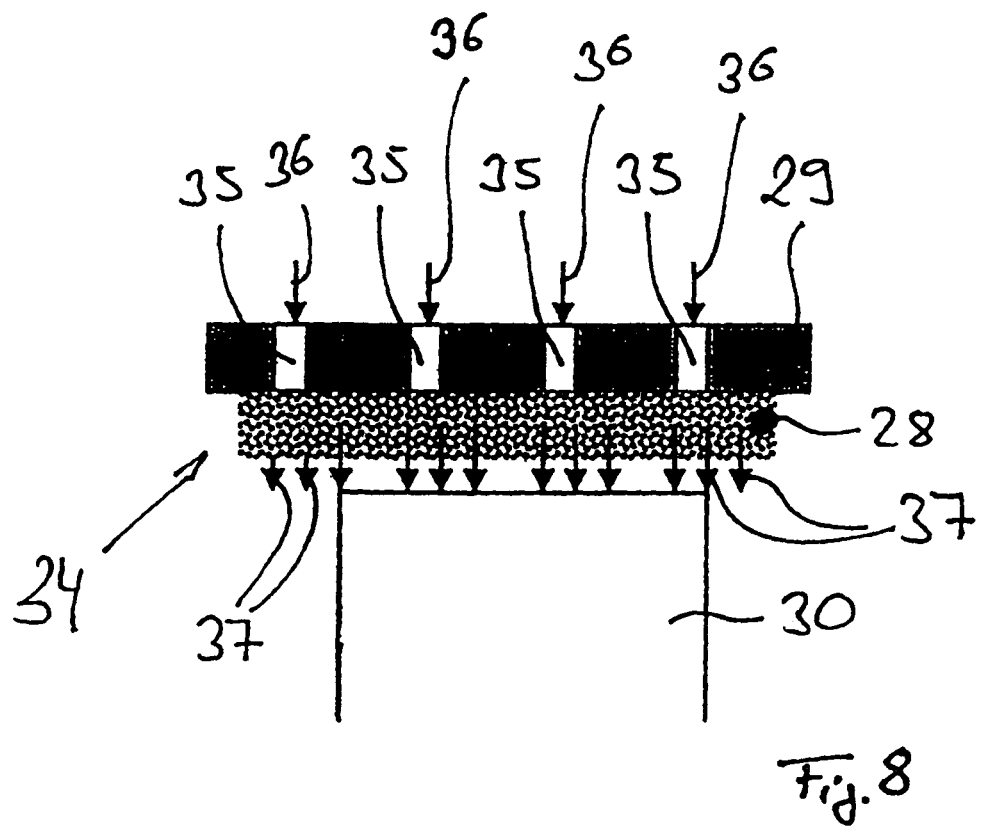
FIG. 8 a gas turbine component according to the invention embodied as an intake lining according to a further example embodiment of the invention, in a sharply schematized illustration.

FIG. 8 shows a further inventive abradable shroud lining 34, which again is formed of a metal foam 28 and a carrier 29 for the metal foam. In the example embodiment of FIG. 8, openings or bored holes 35 are introduced into the carrier 29. In the sense of the arrows 36, a gas flow can be directed through the bored holes 35 for cooling, whereby in this case, the metal foam 28 is embodied opened-celled or open-pored. Such an open-pored embodied metal foam 28 can be flowed-through by gas. This is indicated by the arrows 37.

FIGS. 9 to 13 show further preferred gas turbine components, that are formed region-wise of metal foam, whereby all gas turbine components shown in FIGS. 9 to 13 form a pipe line system. In the example embodiment of the FIG. 9, a pipe line system 38 is shown, whereby the pipe line system 38 is formed by a closed-walled pipe 39, which is concentrically enclosed on its outer side by metal foam 40. With such a pipe line system, which consists region-wise of metal foam, improved vibration characteristics as well as thermal isolation characteristics of pipe line systems within gas turbines can be realized. Thereby an ignition or coking of the pipe line system can be prevented.

FIG. 10 shows an embodiment of a pipe line system 41, whereby the pipe line system 41 of the FIG. 10 is again formed by a closed-walled pipe 39, which is surrounded on the outer side by metal foam 40. FIG. 10 makes clear that the metal foam 40 on the outer side of the closed-walled pipe 39 can have any desired arbitrary shape.

The pipe line system 42 illustrated in FIG. 12 differs from the pipe line system 41 of the FIG. 10 in that a securing means 43 is integrated in the metal foam 40. In the sense of the invention, a securing means can be foamed onto the pipe in a simple manner. Hereby the connection with other components is significantly simplified.

FIG. 11 shows an inventive pipe line system 44 which again is formed region-wise of metal foam. In the example embodiment of the FIG. 11, once again a closed-walled pipe 39 is provided, whereby the pipe 39 in the example embodiment of the FIG. 11 includes a closed inner wall 45 as well as a closed outer wall 46. Thus, in the example embodiment of the FIG. 11, the pipe 39 is embodied double-walled. The metal foam 40 is positioned between the two walls 45 and 46.

A further example embodiment of an inventive pipe line system 47 is shown by FIG. 13, whereby the pipe line system 47 of the FIG. 13 comprises four closed-walled pipes 39 that are positioned together in a metal foam 40. In the example embodiment of the FIG. 13, thus several pipes 39 are combined together by the metal foam 40 to form an integral unit.

At this point it is noted that gas, oil or also propellant can be directed through the pipe line systems of the FIGS. 9 to 13 embodied according to the invention.

All of the example embodiments of an inventive gas turbine component shown in FIGS. 2 to 13 are static components for aircraft engines. The inventive components have a minimized weight, good thermal isolation characteristics, and are furthermore producible in a cost-advantageous manner. Arising vibrations can be surely and well damped via the metal foam.

The invention claimed is:

1. A gas turbine engine comprising a rotatable rotor with rotor blades, which optionally have seal fins on radially outer blade tips of the rotor blades, and an abradable shroud lining arranged circumferentially around the blade tips such that the seal fins or the blade tips graze the abradable shroud lining, wherein:
   the abradable shroud lining comprises a carrier having a carrier surface, and an open-pored metal foam component having a back surface and a front surface opposite the back surface,
   the metal foam component comprises an open-pored metal foam that is bare and exposed at the front surface of the metal foam component, which is arranged relative to the rotor so that the seal fins or the blade tips directly graze the metal foam,
   the back surface of the metal foam component is rigidly connected continuously surfacially along the back surface onto the carrier surface of the carrier, whereby the metal foam component is continuously supported along the back surface thereof on the carrier surface of the carrier; and
   the carrier has holes passing therethrough and opening through the carrier surface to allow gas communication through the holes and from the holes directly into the back surface of the metal foam component and through the open-pored metal foam in a radial gas flow direction that extends radially relative to an axis of the gas turbine engine.

2. The gas turbine engine according to claim 1, wherein the entire back surface of the metal foam component and the entire carrier surface each extend continuously along respective straight axis-parallel lines on respective cylindrical contours.

3. The gas turbine engine according to claim 1, further comprising a glue, wherein the metal foam component is rigidly connected surfacially along the entire back surface onto the carrier surface of the carrier by the glue.

4. The gas turbine engine according to claim 1, further comprising a solder, wherein the metal foam component is rigidly connected surfacially along the entire back surface onto the carrier surface of the carrier by the solder.

5. The gas turbine engine according to claim 1, wherein the rotor blades have the seal fins on the radially outer blade tips, and the metal foam component is arranged so that the seal fins directly graze the metal foam at the front surface of the metal foam component.

6. The gas turbine engine according to claim 1, wherein the metal foam component consists of the metal foam.

7. The gas turbine engine according to claim 6, wherein the metal foam component consists of a single uniform monolithic component of the metal foam.

8. The gas turbine engine according to claim 1, wherein the front surface of the metal foam component has a stepped surface contour as seen on an axial plane.

9. The gas turbine engine according to claim 1, wherein the metal foam comprises a titanium alloy or a nickel alloy.

10. The gas turbine engine according to claim 1, wherein the metal foam comprises an aluminum alloy.

11. The gas turbine engine according to claim 1, wherein the metal foam comprises a cobalt alloy or an iron alloy.

12. The gas turbine engine according to claim 1, wherein the metal foam comprises an intermetallic titanium-aluminum alloy.

13. The gas turbine engine according to claim 1, wherein said open-pored metal foam is produced by, and has characteristics as result from being produced by, foaming expansion of a melted metal powder.

14. A method of making an abradable shroud lining for a gas turbine engine, comprising the steps:

a) mixing together a metal powder and a propellant to prepare a mixed powder;
b) compressing and forming the mixed powder to form a semi-finished part;
c) heating the semi-finished part sufficiently so as to melt the metal powder and so as to trigger evolution of gas by the propellant;
d) expanding the semi-finished part by a foaming expansion due to the evolution of gas by the propellant, to produce an expanded part of an open-pored metal foam;
e) cooling the expanded part so as to end the foaming expansion and solidify the open-pored metal foam to form thereof a metal foam component;
f) rigidly connecting the metal foam component continuously surfacially along a back surface thereof onto a carrier surface of a carrier that has holes passing therethrough and opening through the carrier surface to allow gas communication through the holes, whereby the metal foam component is continuously supported along the back surface thereof on the carrier surface of the carrier and the open-pored metal foam allows gas communication from the holes of the carrier directly into the back surface of the metal foam component and through the open-pored metal foam, whereby the metal foam component rigidly connected to the carrier forms an abradable shroud lining; and
g) mounting the abradable shroud lining in a gas turbine engine circumferentially around rotor blades of the engine so that the rotor blades graze a front surface of the metal foam component opposite the back surface thereof.

15. The method according to claim 14, wherein the propellant comprises titanium hydride.

16. The method according to claim 14, wherein the metal powder comprises a powder of a titanium alloy or a nickel alloy.

17. The method according to claim 14, wherein said rigid connecting in said step f) comprises gluing the metal foam component surfacially onto the carrier.

18. The method according to claim 14, wherein said step e) further comprises surface machining the expanded part to prepare the metal foam component.

19. A gas turbine engine comprising a rotatable rotor with rotor blades, which optionally have seal fins on radially outer blade tips of the rotor blades, and an abradable shroud lining arranged circumferentially around the blade tips such that the seal fins or the blade tips graze the abradable shroud lining, wherein:
the abradable shroud lining comprises a carrier having a carrier surface, and an open-pored metal foam component having a back surface and a front surface opposite the back surface,
the metal foam component comprises an open-pored metal foam that is bare and exposed at the front surface of the metal foam component, which is arranged relative to the rotor so that the seal fins or the blade tips directly graze the metal foam,
the back surface of the metal foam component is rigidly connected surfacially onto the carrier surface of the carrier;
the carrier has holes passing therethrough and opening through the carrier surface to allow gas communication through the holes and from the holes directly into the back surface of the metal foam component and through the open-pored metal foam in a radial gas flow direction that extends radially relative to an axis of the gas turbine engine; and
the entire back surface of the metal foam component and the entire carrier surface each extend continuously along respective straight axis-parallel lines on respective cylindrical contours.

* * * * *